(12) United States Patent
Clarke

(10) Patent No.: US 11,958,214 B2
(45) Date of Patent: Apr. 16, 2024

(54) INJECTION MOLDED PREFORM AND MANUFACTURE THEREOF

(71) Applicant: GR8 Engineering Limited, Chichester (GB)

(72) Inventor: Peter Reginald Clarke, Sussex (GB)

(73) Assignee: GR8 Engineering Limited, Chichester (GB)

( * ) Notice: Subject to any disclaimer, the term of this patent is extended or adjusted under 35 U.S.C. 154(b) by 289 days.

(21) Appl. No.: 17/425,378

(22) PCT Filed: Jan. 28, 2020

(86) PCT No.: PCT/EP2020/052064
§ 371 (c)(1),
(2) Date: Jul. 23, 2021

(87) PCT Pub. No.: WO2020/157078
PCT Pub. Date: Aug. 6, 2020

(65) Prior Publication Data
US 2022/0088831 A1 Mar. 24, 2022

(30) Foreign Application Priority Data
Feb. 1, 2019 (GB) .................................. 1901435

(51) Int. Cl.
*B29B 11/08* (2006.01)
*B29B 11/14* (2006.01)
(Continued)

(52) U.S. Cl.
CPC .............. *B29B 11/08* (2013.01); *B29B 11/14* (2013.01); *B29C 2949/0781* (2022.05);
(Continued)

(58) Field of Classification Search
CPC ... B29B 11/08; B29B 11/14; B29C 2045/563; B29C 2049/024; B29C 2949/0715;
(Continued)

(56) References Cited

U.S. PATENT DOCUMENTS

| 2014/0030461 A1 | 1/2014 | Bunel et al. |
| 2017/0173825 A1 | 6/2017 | Clarke |
| 2017/0252958 A1 | 9/2017 | Lane et al. |

FOREIGN PATENT DOCUMENTS

| EP | 2263843 A1 | 12/2010 |
| GB | 2526665 B | 8/2016 |

(Continued)

OTHER PUBLICATIONS

Combined Search and Examination Report under Section 17 and 18(3) in related GB application No. 1901435.6 dated Jul. 23, 2019.
(Continued)

*Primary Examiner* — Yan Lan
(74) *Attorney, Agent, or Firm* — Polsinelli, P.C.

(57) ABSTRACT

An injection molded thermoplastic preform for blow moulding to form a container, the preform base of a central part having a first, downwardly and radially inwardly tapering portion therebetween which increases in thickness from a radially outer end of the first tapering portion adjacent to the hollow transition portion to a radially inner end of the first tapering portion adjacent to the gate part and the middle part opposite the gate part can allow the injected resin to be urged back through the gate at the end of the injection moulding cycle at a lower fluid pressure in the vicinity of the gate which is associated with high resin temperatures. The technical effect achieved by the first tapering portion is that crystallinity in the gate area is minimized or eliminated, which avoids or minimizes partial blocking of the gate which would otherwise restrict the injected resin from being (Continued)

urged back through the gate at the end of the injection moulding cycle.

11 Claims, 2 Drawing Sheets

(51) Int. Cl.
*B29K 105/00* (2006.01)
*B29L 31/00* (2006.01)

(52) U.S. Cl.
CPC .......... *B29C 2949/0818* (2022.05); *B29C 2949/0829* (2022.05); *B29C 2949/0856* (2022.05); *B29C 2949/0872* (2022.05); *B29C 2949/22* (2022.05); *B29C 2949/24* (2022.05); *B29C 2949/26* (2022.05); *B29C 2949/28* (2022.05); *B29K 2105/258* (2013.01); *B29L 2031/712* (2013.01)

(58) Field of Classification Search
CPC ...... B29C 2949/078; B29C 2949/0781; B29C 2949/0818; B29C 2949/0829; B29C 2949/0856; B29C 2949/0872; B29C 2949/22; B29C 2949/24; B29C 2949/26; B29C 2949/28; B29C 45/261; B29C 45/561; B29C 49/06; B29C 49/071; B29K 2105/258; B29K 2995/004; B29K 2995/0043; B29L 2031/712
See application file for complete search history.

(56) References Cited

FOREIGN PATENT DOCUMENTS

| | | |
|---|---|---|
| JP | 2004090425 A | 3/2004 |
| WO | 2009/076745 A1 | 6/2009 |

OTHER PUBLICATIONS

International Search Report and Written Opinion in related international application No. PCT/EP2020/052064 dated Apr. 15, 2020.
International Preliminary Report on Patentability in related international application No. PCT/EP2020/052064 dated Jul. 27, 2021.

INJECTION MOLDED PREFORM AND MANUFACTURE THEREOF

FIELD OF THE INVENTION

The present invention relates to an injection moulded preform and to a method of injection moulding a preform. In particular, the present invention relates to the injection moulding of preforms from thermoplastic material for subsequent formation of blow moulded containers.

BACKGROUND

Injection moulding of articles from plastics materials, in particular thermoplastic polymers, is well known in the art. In particular, the injection moulding of containers, and preforms for containers, from plastics material is conventional in the art.

It is often desired to injection mould plastics containers having a small wall thickness, for example to reduce material costs. When it is necessary to injection mould a container having a high L/T ratio (where L is the flow length of the molten plastics material from the injection inlet and T is the wall thickness), a high injection pressure at the injection inlet is needed to ensure that the mould cavity is filled with the molten plastics material. The injection inlet acts to restrict material flow therethrough, and the wall section directly opposite the injection inlet also restricts the material flow into the cavity.

The conventional approach to attempt to reduce the high injection pressure at the injection inlet is to inject the molten plastics material at a faster injection rate, and to raise the melt temperature to lower the melt viscosity, to enable the mould to be filled by the molten plastics material.

It is also well known that in order to reduce the fill pressure, it is possible when designing a container to increase the base thickness, particularly in the injection inlet area. This injection inlet area is also the hottest area of the injection moulding. As all of the material in the sidewall has to flow across the base, within an interior gap defined between the static exterior skin layers laid down during the first phase of filling, base cooling is always a problem. Another problem with such laminar flow across the base is that the skins are progressively solidifying and therefore getting thicker, narrowing the flow channel. This causes a further restriction on the material flow.

All of this adds up to the need to flow the molten material into the cavity at a faster rate, and to do that one needs to increase the fill pressure. The higher fill pressure will, in turn, require a higher clamp pressure to counter the hydraulic force on the end of the core. It should be readily apparent to the skilled reader why injection moulding machines for the manufacture of plastics packaging need to have very high injection speeds and pressures, and very rigid platens, to make what appears to be a simple container or preform.

The use of high fill pressures often results in non-concentric preforms. The fill pressure is so high that it flexes the core off-axis, resulting in a non-concentric preform. Core flexing is particularly problematic with high aspect ratio length/thickness preforms for forming high aspect ratio bottles which have reduced wall thickness, and are consequently lighter in weight, for any given container volume. The industry standard for acceptable non-concentricity is a maximum wall thickness variation of 0.1 mm for a 42 gram preform for forming a 2 litre carbonated soft drinks (CSD) bottle. However, there is a need to provide higher concentricity for high aspect bottles to permit even greater weight savings to be achieved.

Preforms of increased weight not only incur greater material costs, but also, particularly when used in an injection mould—cool—reheat blow moulding process, require additional thermal energy to heat the thermoplastic material for injection and reheat blow moulding. There is a general need in the art to reduce energy costs during preform and container manufacture.

Even though high fill pressures may be quite high, the molten material flow rate is typically only at an industry standard of up to 15 grams per second, for example for a preform of 3.25 mm wall thickness and a length of 145 mm. This requires a fill time of at least 2 seconds to fill a 30 gram preform cavity. The total cycle time is correspondingly high, for example 22 seconds for a 3.25 mm thickness preform, which may be reduced to 14 seconds using secondary cooling. Production rates are generally increased by increasing the number of mould cavities in the injection moulding apparatus, for example currently up to 216 cavities, which increases the cost and complexity of the injection moulding apparatus. There is a general need in the art to reduce cycle times costs during preform and container manufacture, without excessively increasing the cost and complexity of the injection moulding apparatus.

The Applicant's earlier GB-A-2526665 and GB-A-2524728 addressed this need and disclose an injection moulded thermoplastic preform for blow moulding to form a container, the preform comprising a lower closed base portion, a hollow body portion, a hollow transition portion between the lower closed base portion and the hollow body portion, and an upper open end portion adjacent to an upper part of the hollow body portion, wherein the closed base portion comprises a central portion which extends over at least 50% of an internal radius of a lower end of the hollow body portion and has a shallow concave internal curvature, and the transition portion comprises an upwardly and radially outwardly tapering portion extending away from the central portion to connect to the hollow body portion, the tapering portion is inclined to a longitudinal axis of the preform and the tapering portion increases in thickness from the central portion to the hollow body portion.

The preform disclosed in GB-A-2526665 and GB-A-2524728 is made by a method of injection moulding comprising the steps of:
a. providing an injection mould defining a mould cavity for moulding a preform comprising a lower closed base portion, a hollow body portion, a hollow transition portion between the lower closed base portion and the hollow body portion, and an upper open end portion adjacent to an upper part of the hollow body portion, the injection mould comprising a first mould part defining the outer surface of the mould cavity and a second mould part in the form of a movable core defining the inner surface of the mould cavity,
b. disposing the movable core in a preliminary forward position,
c. injecting molten thermoplastic material into the mould cavity thorough a gate opposite to a free forward end of the core, the free forward end of the core having a central part, which extends over at least 50% of an external radius of the free forward end and has a shallow convex external curvature, and a transition part including a radially outwardly tapering part extending away from the central part to connect to an elongate body part of the core, the tapering part being inclined to a longitudinal axis of the core, d. moving the core rearwardly during the injection, the first mould part and the free forward end of the core forming therebetween, during at least a portion of the injection, an annular substantially frusto-conical funnel connecting a first cavity region adjacent to the gate with a sidewall cavity region, the molten thermoplastic material flowing through the funnel into the sidewall cavity region; and e. moving the core forwardly after at least a proportion of the thermoplastic material has been injected into the mould cavity to dispose the core in a final moulding forward position in which the mould cavity defines the final shape and dimensions of the thermoplastic preform.

The preform and method of GB-A-2526665 and GB-A-2524728 are predicated on the earlier finding by the present inventor that the provision of a shallow curvature central part of the end of the core and a transition part including a radially outwardly tapering part extending away from the central part, the tapering part being inclined to a longitudinal axis of the core, can reduce filling time, increase flow velocity and decrease non-concentricity in the resultant preform.

However, when the core is moved forwardly after the thermoplastic material has been injected into the mould cavity to dispose the core in a final moulding forward position in which the mould cavity defines the final shape and dimensions of the thermoplastic preform, and the forward movement of the core causes excess injected thermoplastic material to flow back through the gate, which is open, against a holding pressure in the injection apparatus, the gate can become at least partially blocked by premature solidification of the molten thermoplastic material. The thermoplastic material tends to solidify on contact with cool surfaces of the mould cavity. This can cause solid "skins" of solid material to be formed on the cavity inner surfaces, which can restrict resin flow outwardly through the gate.

When the thermoplastic material is a polyester, such as polyethylene terephthalate (PET), or any other crystallisable polymer, for example any other crystallisable polyester resin, excess pressure during the initial injection phase, and/or during the subsequent back flow phase, can, combined with high resin temperature, cause pressure- and/or temperature-induced crystallinity in the polymer. Such pressure- and/or temperature-induced crystallinity can cause the polymer to solidify and act as a dam, restricting back flow of molten resin outwardly through the gate. This in turn can prevent the preform from being injection moulded to the desired dimensions. Also, it is undesirable to have crystalline polyester in the preform base, since this can prevent subsequent blow moulding of a container having the desired dimensions and properties.

There is a need in the art for a cost effective, robust injection moulding process for forming preforms that at least partly overcomes the various problems with known processes as discussed above.

In particular, there is a need for an injection moulding process, that is suitable for producing injection moulded preforms for containers, such as bottles or other containers to be subsequently blow moulded from the preform, having high flow-length:wall thickness ratios, and/or low material stress, which can be produced using conventional injection moulding machines and therefore can be interfaced with the minimum of problems into conventional production practices.

SUMMARY OF THE INVENTION

The present invention aims at least partly to meet these needs in the art of preform manufacture.

The present invention provides an injection moulded thermoplastic preform for blow moulding to form a container.

The present invention further provides a method of injection moulding a thermoplastic preform for blow moulding to form a container.

The method can be used for injection moulding a variety of preforms for containers which can be circular but optionally having a non-circular or non-rounded, e.g. rectangular, configuration.

The present invention is predicated on the finding by the present inventor that the provision in the preform base of a central part having a first, downwardly and radially inwardly tapering portion therebetween which increases in thickness from a radially outer end of the first tapering portion adjacent to the hollow transition portion to a radially inner end of the first tapering portion adjacent to the gate part and the middle part opposite the gate part can allow the injected resin to be urged back through the gate at the end of the injection moulding cycle at a lower fluid pressure in the vicinity of the gate which is associated with high resin temperatures.

The technical effect achieved by the first tapering portion is that crystallinity in the gate area is minimized or eliminated, which avoids or minimizes partial blocking of the gate which would otherwise restrict the injected resin from being urged back through the gate at the end of the injection moulding cycle.

The first tapering portion provides that during back flow of the resin through the gate the region of highest fluid pressure is at a location remote from the gate, in particular towards or at the narrow radially outer end of the first tapering portion which is adjacent to the hollow transition portion. The mould temperature, and consequently the resin temperature, is lower at such a location than the corresponding temperatures at, or in the vicinity of, the gate. Consequently, by providing that any high pressure region during back flow is located in a relatively low temperature region, the problem of resin crystallisation during back flow is minimised or avoided.

In addition, the preform is provided with a second, upwardly and radially outwardly tapering portion extending away from the central part to connect to the hollow body portion, the second tapering portion increasing in thickness from the central part to the hollow body portion. The provision of such a second tapering portion can reduce filling time, increase flow velocity and decrease non-concentricity in the resultant preform.

In summary therefore, the second tapering portion improves the filling phase of the injection moulding cycle and the first tapering portion improves the subsequent back flow phase of the injection moulding cycle.

During at least a portion of the injection, the molten thermoplastic material flows through an annular substantially conical funnel provided by the second tapering portion which reduces pressure adjacent to the gate and the funnel causes acceleration of the molten resin material into the sidewall cavity region. A velocity of the injected molten thermoplastic material increases as the material flows through the funnel. During the injection, the pressure of the injected molten thermoplastic material is substantially uniform around the circumference of the annular substantially conical funnel, even at high resin velocity. It is believed that high resin viscosity past the free end of the core tends to reduce the likelihood of the core wobbling laterally as a result of lateral off-axis pressure differences. The shallow curvature central part also minimises any off-axis biasing force on the free forward end of the core. The cumulative effect of the central part and the funnel is to avoid any off-axis force on the core which could otherwise cause any significant non-concentricity in the preform, while increasing flow velocity and decreasing filing time.

The result is that a very high flow rate of resin can be achieved, for example up to 200 grams per second as compared to 15 grams per second in typical preform injection moulding. The filing time for a typical preform can be significantly reduced, as compared to known typical filling times, to less than 2 seconds for a typical 30 gram preform, even to as low as 0.2 seconds. The weight of the preform can also be significantly reduced for any given preform size to form a blow moulded container of a given size or volume, due to material weight savings in the thinner preform base and sidewall. The weight savings not only reduce material costs but also reduce thermal energy consumption during preform manufacture, requiring molten resin for injection moulding, and during container manufacture by blow moulding the preform into a container, the blow moulding requiring the preform to be heated, or reheated, to the blow moulding temperature. Also since the preform is of reduced weight and higher length:thickness (L/T) ratio, zonal heating or reheating of the preform along its length is facilitated because the length of the preform can be increased, and the wall thickness reduced, for any given preform size to form a blow moulded container of a given size or volume. The preform base design, including the shallow curvature central portion, and corresponding morphology in the core of the mould, reduces biasing forces on the core which can increase the concentricity of the preform even though high resin velocities are employed. The funneling effect increases the resin velocity into the sidewall, allowing high L/T ratios to be achieved with reduced filling time and reduced resin material consumption, which still achieving very high concentricity.

BRIEF DESCRIPTION OF THE DRAWINGS

Embodiments of the present invention will now be described by way of example only with reference to the accompanying drawing, in which.

DETAILED DESCRIPTION

Figure 1:
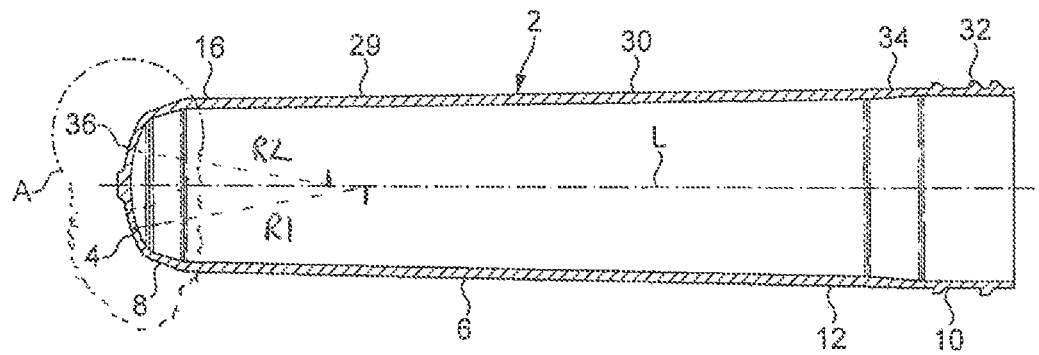
FIG. 1 is a schematic cross-section through an injection moulded preform in accordance with an embodiment of the present invention.
Figure 2:
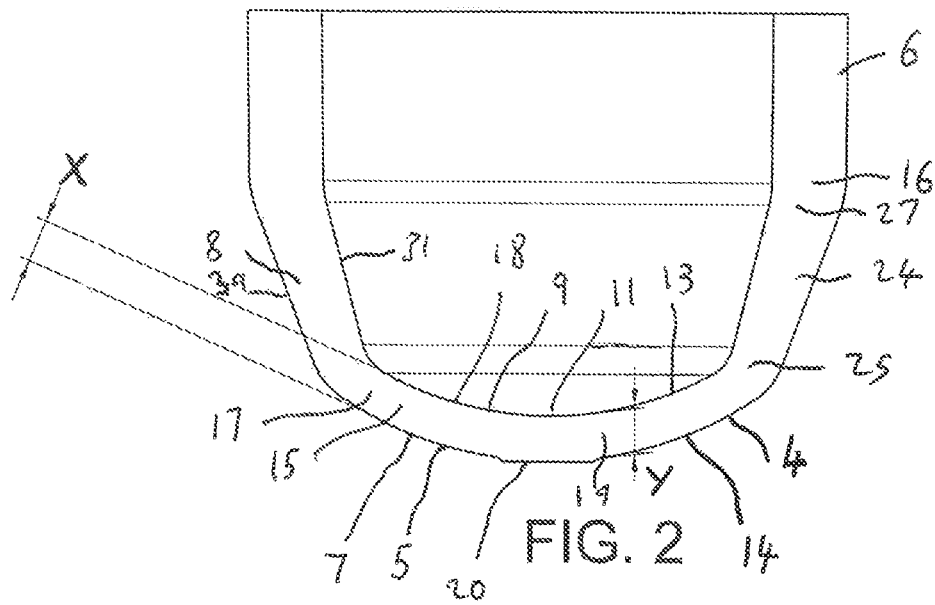
FIG. 2 is an enlarged schematic cross-section through the part of the closed end, indicated as A, of the injection moulded preform of FIG. 1.

Referring to FIGS. 1 and 2, there is shown an injection moulded thermoplastic preform 2 for blow moulding to form a container, in particular a bottle.

The preform 2 is composed of a biaxially orientable polymer, typically polyester, such as polyethylene terephthalate. Typically, the polyethylene terephthalate has an intrinsic viscosity of at least 0.7. Other polyesters, or polyester blends, may be employed, and such materials are well known for the manufacture of blow moulded containers, particularly bottles.

The preform 2 comprises a lower closed base portion 4, a hollow body portion 6, a hollow transition portion 8 between the lower closed base portion 4 and the hollow body portion 6, and an upper open end portion 10 adjacent to an upper part 12 of the hollow body portion 6.

The closed base portion 4 comprises a central part 14 which extends over at least 50% of an internal radius of a lower end 16 of the hollow body portion 6. The central part 14 may extend over at least 70%, for example from 75 to 90%, of the internal radius of the lower end 16 of the hollow body portion 6.

The central part 14 is dome shaped and has a shallow concave internal curvature 18 with a minimum radius of internal curvature of 20 mm. Optionally the radius of internal curvature is from 50 to 200 mm, for example from 100 to 200 mm. The central part 14 typically has a substantially constant radius of internal curvature.

The central part 14 has an external surface 5 which comprises an outwardly raised gate part 20, otherwise known in the art as a gate pin, surrounding a central longitudinal axis L of the preform 2. A first peripheral part 7 surrounds the gate part 20. The first peripheral part 7 is convex and curved. The central part 14 also has an internal surface 9 which is concave and curved and comprises a middle part 11 opposite the gate part 20 and a second peripheral part 13 surrounding the middle part 11.

The first and second peripheral parts 7, 13 define a first, downwardly and radially inwardly tapering portion 15 therebetween which increases in thickness from a radially outer end 17 of the first tapering portion 15 adjacent to the hollow transition portion 8 to a radially inner end 19 of the first tapering portion 15 adjacent to the gate part 20 and the middle part 11 opposite the gate part 20.

The first peripheral part 7 has a first radius of curvature R1 and the second peripheral part 13 has a second radius of curvature R2, wherein the first radius of curvature R1 is greater than the second radius of curvature R2 (R1 and R2 are shown in schematic form and not to scale in FIG. 1). The first tapering portion 15 preferably increases in thickness δT by from 0.075 to 0.25 mm, typically by from 0.075 to 0.125 mm, from the radially outer end 17 (having thickness X as shown in FIG. 2) of the first tapering portion 15 to the radially inner end 19 (having thickness Y as shown in FIG. 2 of the first tapering portion 15. In the preferred embodiment, the radially outer end 17 of the first tapering portion 15 has a thickness (X) of from 1.7 to 2.1 mm and the radially inner end 19 of the first tapering portion 15 has a thickness (Y) of from 1.8 to 2.2 mm, with the proviso that there is an increase in thickness (from X to Y) as described above. Typically, the first tapering portion 15 increases in thickness δT by from 0.1 to 0.3 mm from the radially outer end 17 of the first tapering portion 15 to the radially inner end 19 of the first tapering portion 15.

In the illustrated embodiment, the central part 14 has a radius $R_{CP}$, measured at the internal surface 18 of the preform 2 at the radially outer end 17 of the first tapering portion 15 and along a direction which is orthogonal to the longitudinal axis L of the preform 2, of typically from 6 to 8 mm and the first tapering portion 15 increases in thickness δT by from 0.075 to 0.25 mm from the radially outer end 17 of the first tapering portion 15 to the radially inner end 19 of the first tapering portion 15. The ratio of $R_{CP}/\delta T$ represents the inverse of the rate of change in thickness of the first tapering portion 15, and therefore a lower value of the $R_{CP}/\delta T$ ratio represents a higher rate of change in thickness of the first tapering portion 15. Typically the ratio of $R_{CP}/\delta T$ is from 30 to 70, for example from 40 to 60.

The transition portion 8 comprises or consists of a second, upwardly and radially outwardly tapering portion 24 extending away from the central part 14 to connect to the hollow body portion 6. The second tapering portion 24 increases in thickness from the central part 14 to the hollow body portion 6.

The second tapering portion 24 has a lower end 25 adjacent to the central part 14 and an upper end 27 adjacent to the hollow body portion 6. The second tapering portion 24 is substantially frustoconical and defined between outer and inner frustoconical walls 39, 31. The second tapering portion 24 increases in wall thickness, measured between the outer and inner frustoconical walls 39, 31, from the lower end 25 adjacent to the central part 14, in particular adjacent to the radially outer end 17 of the first tapering portion 15, to the upper end 27 adjacent to the hollow body portion 6. Accordingly, the wall thickness, measured between the outer and inner frustoconical walls 39, 31, at the upper end 27 is greater than the wall thickness, measured between the outer and inner frustoconical walls 39, 31, at the lower end 25.

In the preferred embodiments, the outer frustoconical wall 39 is inclined at an angle, measured between the lower end 25 and the upper end 27, of from 18 to 24 degrees to the longitudinal axis L of the preform 2 and the inner frustoconical wall 31 is inclined at an angle, measured between the lower end 25 and the upper end 27, of from 12 to less than 18 degrees to the longitudinal axis L of the preform 2.

The second tapering portion 24 typically has a length of at least 5 mm, optionally from 5 to 15 mm. The second tapering portion 24 increases in thickness by at least 25%, optionally from 25% to 75%, from the lower end 25 adjacent to the central part 14 to the upper end 27 adjacent to the hollow body portion 6. The outer frustoconical wall 31 preferably has a length, measured along the outer frustoconical wall 39 between the lower closed base portion 4 and the hollow body portion 6, of from 3 to 5 times the wall thickness of the annular wall of the hollow body portion 6.

The second tapering portion 24 typically has a wall length which is from 3 to 10% of the total length of the preform 2.

In the illustrated embodiment, a majority of the length of the body portion 6 is substantially tubular. The external surface 29 of the body portion 6 tapers radially outwardly at an angle of 1 degree or less in a direction from the transition portion 8 to the upper open end portion 10. The cross-section of the body portion 6 is substantially cylindrical, substantially elliptical or substantially polygonal along at least 50%, optionally at least 90%, of the length of the body portion 6. Preferably, a wall section 30 of the body portion 6 has a length:thickness ratio of at least 75:1, optionally from 75:1 to 150:1 to enable manufacture of a blow moulded container having an L/T ratio of at least 75:1, optionally from 75:1 to 150:1.

In the illustrated embodiment, the upper open end portion 10 includes a neck finish 32 and an internal taper region 34 connecting the body portion 6 to the neck finish 32.

In the illustrated embodiment, the external surface 36 of the closed base portion 4 of the preform 2 is dimensioned so as to be incapable of being lockingly fitted into the open end portion 10 of an identical preform 2. Such non-locking preforms are suitable for blow moulding to form bottles.

Figure 3:
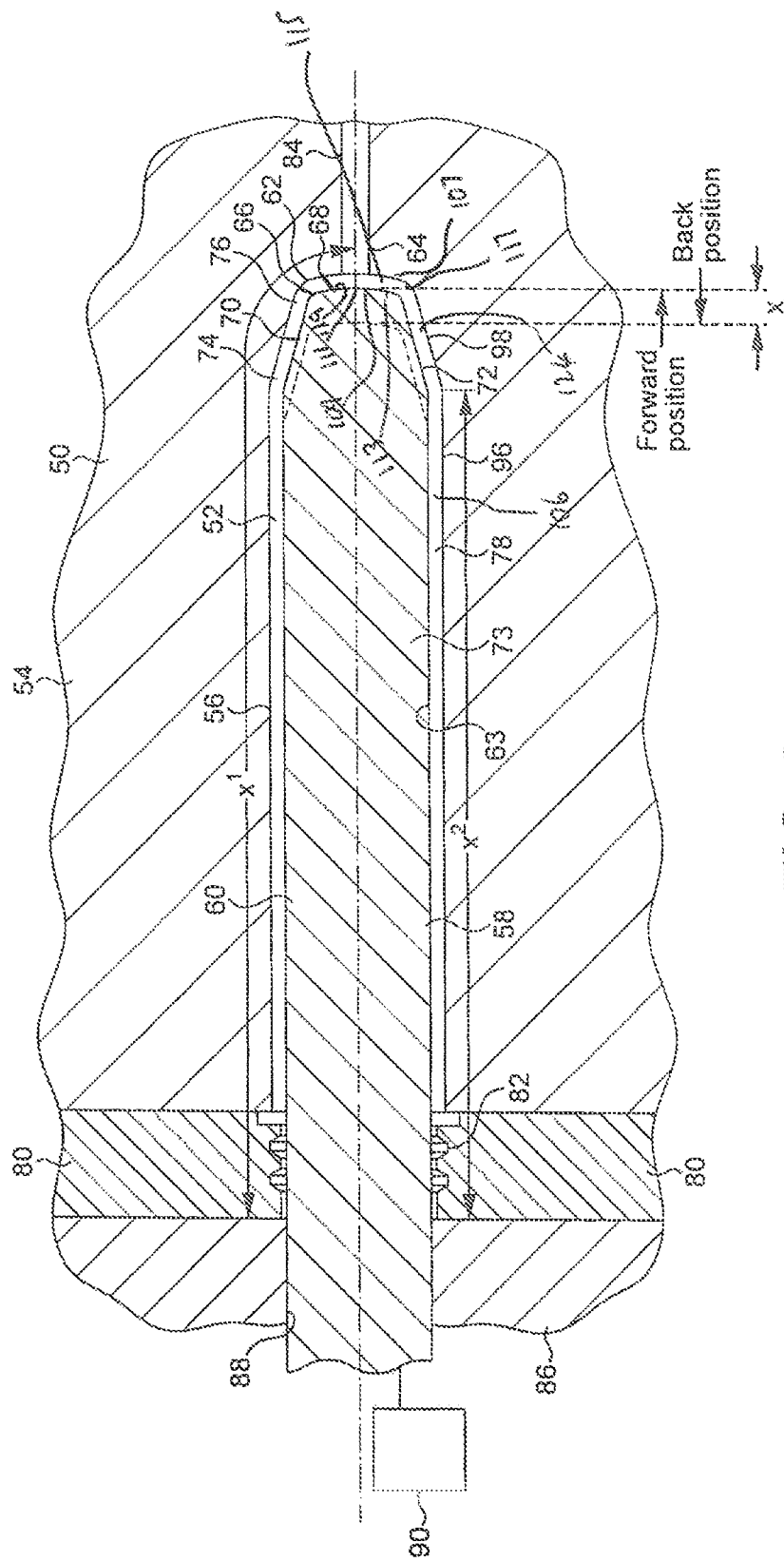
FIG. 3 is a schematic cross-section through an injection mould having a movable core for use in a method in accordance with an embodiment of the present invention.

Referring to FIG. 3, there is shown a method of injection moulding the thermoplastic preform 2 for blow moulding to form a container, in particular a bottle.

In the method, there is provided an injection mould 50 defining a mould cavity 52 for moulding a preform 2, such as the preform 2 of FIG. 1. As described above, the preform 2 comprises a lower closed base portion 4, a hollow body portion 6, a hollow transition portion 8 between the lower closed base portion 4 and the hollow body portion 6, and an upper open end portion 10 adjacent to an upper part 12 of the hollow body portion 6. The injection mould 50 comprises a first mould part 54 defining the outer surface 56 of the mould cavity 52 and a second mould 58 part in the form of a movable elongate core 60 defining the inner surface 63 of the mould cavity 52. The mould 50 is provided with an injection inlet in the form of a gate 64.

A plurality of neck splits 80 is provided at the end 82 of the cavity 52 remote from the feed nozzle 84 exiting at the gate 64. The neck splits 80 are shaped to mould the outer shape of one end of the preform 2 to be injection moulded, in this embodiment the neck finish 32 of the preform 2 for subsequent blow moulding to form a bottle. The neck splits 80 also support the injection moulded preform 2 when it is removed from the cavity 52 after the injection moulded material has solidified.

A core bearing 86 is adjacent to the plurality of neck splits 80 and has a central bore 88 in which the core 60 is slidably received. The core 60 can be translated in a longitudinal direction coaxial with the axis of the cavity 52 and with the feed nozzle 84. Accordingly, the core 60 can selectively be slid in the core bearing 86 either forwardly in a direction into the cavity 52 towards the feed nozzle 84 or rearwardly in a direction out of the cavity 52 away from the feed nozzle 84. Such forward and backward movement can vary the distance of the free forward end 66 of the core 60 from the feed nozzle 84. The core 60 and the neck splits 80 are axially centered with respect to the axis of the cavity 52.

A pressure actuator 90, illustrated entirely schematically in FIG. 2, pushes the core 60. The pressure actuator 90 may be pneumatically controlled, for example the pneumatic fluid being compressed air, or hydraulically controlled. Typically, the maximum applied pressure of the pressure actuator 90 is less than 20 bars pneumatically; however, for large cavitation moulds hydraulic actuators would be used at pressures up to 225 bars.

The pressure actuator 90 can be selectively pressurised to urge the core 60 to a forward position as shown in FIG. 3. The forward position can be defined by a mechanical stop or by interlocking of the two mould parts comprised of the fixed mould part 54 and the movable core 60.

If the pressure actuator 90 is not actuated, or only actuated at a low pressure which is lower than the injection pressure at the feed nozzle 84, then the injection pressure from the injecting molten resin material through the gate 64 can urge the core 60 rearwardly to the rearward position as shown in phantom in FIG. 3. The rearward position can be defined by a mechanical stop.

The first and second mould parts 54, 58 are disposed in a fully closed configuration so as to define the mould cavity 52 therebetween for moulding the preform 2. In the fully closed configuration the cavity outer surface 56 defines the outer shape of the preform 2 to be moulded in the mould cavity 52.

The movable core 60 is disposed in a preliminary forward position. This temporarily locates the core 60 towards the middle part 62 of the outer surface 56 of the mould cavity 52, at substantially, or near to, the final moulding position of the core 60.

Before, or in the initial phase of, the injection moulding cycle the actuator pressure is low or off.

Then molten thermoplastic material is injected into the mould cavity 52 thorough the gate 64 opposite to the free forward end 66 of the core 60. During filling, a valve pin (not shown) in the gate 64 is retracted to allow free flow of the molten thermoplastic material into the mould cavity 52.

Consequently, the core 60 can be urged by the injection pressure in a direction away from the gate 64 which causes the core 60 to move back smoothly against the injection pressure. This moves the core 60 to the position shown by dashed lines in FIG. 3. This increases the thickness T of the portion of the cavity 52 adjacent to the gate 64 by the distance x. The length of the cavity 52 having the desired relatively small final wall thickness is correspondingly reduced from distance $x^1$ to $x^2$, as also shown in FIG. 3. Accordingly, the L/T ratio is significantly reduced, thereby to keep the injection pressure within the cavity 52, in particular in the vicinity of the gate 64, at a low or minimal value.

The free forward end 66 of the core 60 has a central region 68, which extends over at least 50% of an external radius of the free forward end 66. The central region 68 is dome shaped and has a shallow convex external curvature, and is shaped to mould the internal surface of the closed end portion 4 of the preform 2, as shown in FIGS. 1 and 2. The central region 68 has a minimum radius of curvature of 20 mm, preferably from 50 to 200 mm, for example from 100 to 200 mm. The central region 68 typically has a substantially constant radius of internal curvature.

The first mould part 54 has a first peripheral surface 107 which surrounds the gate 64. The first peripheral surface 107 is concave and curved. The central region 68 of the core 60 also has an external surface 109 which is convex and curved and comprises a middle surface 111 opposite the gate 64 and a second peripheral surface 113 surrounding the middle surface 111.

The first and second peripheral surfaces 107, 113 define, when the core 60 is in the forward most position, a first, downwardly and radially inwardly tapering cavity portion 115 therebetween which increases in thickness from a radially outer end 117 of the first tapering cavity portion 115 to a radially inner end 119 of the first tapering cavity portion 115 adjacent to the gate 64 and the middle surface 111 opposite the gate 64.

The first peripheral surface 107 has a first radius of curvature R1 and the second peripheral surface 113 has a second radius of curvature R2, wherein the first radius of curvature R1 is greater than the second radius of curvature R2. The first tapering cavity portion 115 preferably increases in width $\delta W$ by from 0.075 to 0.25 mm, typically by from 0.075 to 0.125 mm, from the radially outer end 117 of the first tapering cavity portion 115 to the radially inner end 119 of the first tapering cavity portion 115. In the preferred embodiment, the radially outer end 117 of the first tapering cavity portion 115 has a width of from 1.7 to 2.1 mm and the radially inner end 119 of the first tapering cavity portion 115 has a width of from 1.8 to 2.2 mm, together with the increase in width $\delta W$, corresponding to the increase in thickness $\delta T$, as described above.

In the illustrated embodiment, the central region 68 has a radius $R_{CR}$, which corresponds to $R_{CP}$, measured at the external surface 109 of the core 60 at the radially outer end 117 of the first tapering cavity portion 115 and along a direction which is orthogonal to the longitudinal axis L of the core 60, of from 6 to 8 mm and the first tapering cavity portion 115 increases in width $\delta W$, which corresponds to $\delta T$, by from 0.075 to 0.25 mm from the radially outer end 117 of the first tapering cavity portion 115 to the radially inner end 119 of the first tapering cavity portion 15. Typically, wherein the ratio of $R_{CR}/\delta W$ is from 30 to 70, for example from 40 to 60.

The free forward end 66 of the core 60 also has a transition part 70 including a radially outwardly frusto-conically tapering part 72 extending away from the central region 68 to connect to an elongate body part 73 of the core 60. The tapering part 72 is inclined at an angle of from 12 to 18 degrees to a longitudinal axis of the core 60. The tapering part 72 is shaped to mould the internal surface of the transition portion 8 of the preform 2, as shown in FIGS. 1 and 2. The first mould part 54 includes a radially outwardly frusto-conically tapering wall 98 extending away from the middle part 62 to connect to an elongate wall 96. The wall 98 is inclined at an angle of from 18 to 24 degrees to a longitudinal axis of the first mould part 54.

When the core is in the forwardmost condition, the tapering part 72 of the core 60 and the tapering wall 98 of the first mould part 54 define therebetween a second, upwardly and radially outwardly tapering cavity portion 124 extending away from the first tapering cavity portion 115 to connect to a body cavity portion 106. The second tapering cavity portion 124 increases in width from the first tapering cavity portion 115 to the body cavity portion 106.

The second tapering cavity portion 124 typically has a length of at least 5 mm, optionally from 5 to 15 mm. The second tapering cavity portion 124 increases in width by at least 25%, optionally from 25% to 75%, from the first tapering cavity portion 115 to the body cavity portion 106.

The core 60 is moved rearwardly during the injection, in other words away from the middle part 62 of the outer surface 56 of the mould cavity 52 and away from the gate 64. This rearward movement increases the volume of the mould cavity 52 in the fully closed configuration and reduces the flow length/thickness ratio of the portion of the cavity 52 adjacent to the gate 64.

The first mould part 54 and the free forward end 66 of the core 60 therefore form therebetween, during at least a portion of the injection, an annular substantially conical funnel 74 connecting a first cavity region 76 adjacent to the gate 64 with a sidewall cavity region 78. The molten thermoplastic material flows through the funnel 74 into the sidewall cavity region 78. A velocity of the injected molten thermoplastic material increases as the material flows through the funnel 74 from the first cavity region 76 to the sidewall cavity region 78. During the injection, the pressure of the injected molten thermoplastic material is substantially uniform around the circumference of the annular substantially conical funnel 74. The substantially flat or shallow curvature central part minimises any off-axis biasing force on the free forward end 66 of the core 60. The cumulative effect of the central part and the funnel is to avoid any off-axis force on the core which could otherwise cause any significant non-concentricity in the preform 2.

After or during mould filling, the pressure actuator 90 urges the core 60 forwardly in a direction into the cavity 52 towards the gate 64, subject to the forward pressure applied to the core 60 overcoming any reverse injection pressure still in the cavity 52. The core 60 is returned to the original forward position which defines the final preform shape and dimensions, thereby expelling any excess material back through the gate 64.

Accordingly, the core 60 is moved forwardly after the thermoplastic material has been injected into the mould cavity 52 to dispose the core 60 in a forwardmost and final moulding position in which the mould cavity 52 defines the final shape and dimensions of the thermoplastic preform 2.

During the forward core movement, the pressure of the injected molten thermoplastic material is substantially uniform around the circumference of the annular substantially conical funnel 74.

The forward movement of the core 60 causes injected thermoplastic material to be urged back through the gate 68 from the first tapering cavity portion 115. During the forward movement of the core 60, the valve pin (not shown) in the gate 64 remains retracted to allow free flow of the molten thermoplastic material out of the mould cavity 52.

The first tapering cavity portion 115 allows the injected resin to be urged back through the gate 64 at the end of the injection moulding cycle at a relatively low fluid pressure in the vicinity of the gate 64 which is associated with high resin temperatures. By providing a selected rate of change in thickness of the first tapering portion 15, as inversely represented by the $R_{CP}/\delta T$ ratio, the fluid pressure in the vicinity of the gate 64 during back flow of the injected resin can be controlled to lower the fluid pressure in the vicinity of the gate 64 which is associated with high resin temperatures.

As shown in FIG. 2, the gate part 20 extends slightly back away from the external surface 5 so a pressure point is moved away from the gate part 20 to be located in an annulus that surrounds the gate part 20.

The technical effect achieved by the first tapering cavity portion 115 is that by moving a pressure point away from the gate part 20, crystallinity in the gate area is minimized or eliminated, which avoids or minimizes partial blocking of the gate 64 which would otherwise restrict the injected resin from being urged back through the gate 64 at the end of the injection moulding cycle.

The first tapering cavity portion 115 provides that during back flow of the resin through the gate 64, the region of highest fluid pressure is at a location remote from the gate 64, in particular at an annulus located towards or at the narrow radially outer end of the first tapering cavity portion 115 which is adjacent to the second tapering cavity portion 124. The mould temperature, and consequently the resin temperature, is lower at such a location than the corresponding temperatures at, or in the vicinity of, the gate 64. Consequently, by providing that any high pressure region during back flow is located in a relatively low temperature region, the problem of resin crystallisation during back flow is minimised or avoided.

In addition, the mould cavity is provided with the second, upwardly and radially outwardly tapering cavity portion 124 extending away from the central region 68, the second tapering cavity portion increasing 124 in thickness from the central region 68 to the body cavity portion 106. The provision of such a second tapering cavity portion 124 can reduce filling time, increase flow velocity and decrease non-concentricity in the resultant preform 2.

In summary therefore, the second tapering cavity portion 124 improves the filling phase of the injection moulding cycle and the first tapering cavity portion 115 improves the subsequent back flow phase of the injection moulding cycle.

The mould cavity 52 is filled with the molten thermoplastic material. After filling the mould cavity 52, during the return of the core 60 from the rearward position to the forward position, excess molten material is expelled back through the gate 64 against a holding phase pressure which is less than the injection pressure. The holding phase pressure is applied to the injected material by an injection apparatus, the holding phase pressure being selected to accommodate shrinkage of the injected material within the mould during cooling. After the injected material has solidified, the applied external pressure is reduced during cooling of the injected material. The reduction of the applied external pressure can be triggered at the start of the cooling phase, or after a short delay to allow the injection pressure to diminish.

For at least a part of the injection step, or for all of the injection step, the molten thermoplastic material is injected into the mould cavity 52 thorough the gate 64 at a flow rate of from 20 to 200 grams per second, optionally from 40 to 200 grams per second, further optionally from 40 to 100 grams per second or 100 to 200 grams per second. The injection step is typically carried out in a period of less than 2 seconds, optionally less than 1 second, further optionally less than 0.5 seconds, still further optionally less than 0.2 seconds, further optionally from 0.075 to 0.125 seconds.

Typically, the injection step, the rearward core movement to form the funnel and the subsequent forward core movement to the final moulding forward position are carried out over a total time period of less than 10 seconds, optionally less than 8 seconds, optionally from 3 to less than 6 seconds.

The core 60 is urged into the forward position by an applied external pressure, applied by an actuator, and moved to the rearward position by pressure of the injecting molten material. The actuator pressure is less than 20 bar, when applied by compressed air or 225 bar for a hydraulic fluid. Typically, an area ratio between the actuator area and the area of the core is less than 20:1 for pneumatic actuation. It will be readily apparent to those skilled in the art that smaller actuators could be used with higher pressures, such as typically used with hydraulic actuator systems i.e. 140 bar. A single actuator may be provided for plural mould cavities.

After substantially filling the mould, the mould surface is restored to its original position. There is no increase in component weight or cooling time. The excess material is pushed back through the open injection inlet against the low holding phase pressure.

Preferably, after the injected material has solidified, the applied external pressure is reduced during cooling of the injected material. This can be triggered at the start of the cooling phase or after a short delay to allow the pressure to diminish. This provides the advantage that the cavity pressure is reduced before opening the mould. This reduces the cooling time required before opening the mould.

Accordingly, the present invention provides a method which actively changes the L/T ratio during injection by allowing the core to move back, before or during injection, to effectively lessen the L/T ratio. After the filling and holding phase, applied to the material within the mould, the core is re-set. This substantially reduces the force required as there is no counter filling pressure from the moulding machine because the material has already fully filled the cavity and any shrinkage has been substantially accommodated by the holding phase.

Optionally, the container has an L/T ratio of 50:1 or greater, wherein where L is the flow length of the molten plastics material from the injection inlet and T is the wall thickness.

The method of this invention in employs a mould in an injection moulding machine in which the filling pressure of the injected material to be moulded is controlled by moving a core, or a part of a core, away from the injection inlet. This movement of a mould part can vary the volume of the base portion of the mould cavity, and increase the base thickness opposite the injection inlet and so reduces the L/T ratio, and thereby reduce the filling pressure of the injected material.

Although various embodiments of the present invention have been described in detail, it will be apparent to those skilled in the art that other modifications of the injection moulded preform and the injection moulding method may be employed that are within the scope of the invention as defined in the appended claims.

The invention claimed is:

1. An injection moulded thermoplastic preform for blow moulding to form a container, the preform comprising a lower closed base portion, a hollow body portion, a hollow transition portion between the lower closed base portion and the hollow body portion, and an upper open end portion adjacent to an upper part of the hollow body portion, wherein the closed base portion comprises a central part which extends over at least 50% of an internal radius of a lower end of the hollow body portion, the central part having an external surface which comprises an outwardly raised gate part surrounding a central longitudinal axis of the preform and a first peripheral part surrounding the gate part, the first peripheral part being convex and an internal surface which is concave and comprises a middle part opposite the gate part and a second peripheral part surrounding the middle part, wherein the first and second peripheral parts define a first, downwardly and radially inwardly tapering portion therebetween which increases in thickness from a radially outer end of the first tapering portion adjacent to the hollow transition portion to a radially inner end of the first tapering portion adjacent to the gate part and the middle part opposite the gate part, wherein the first peripheral part is curved and has a first radius of curvature and the second peripheral part is curved and has a second radius of curvature, wherein the first radius of curvature is greater than the second radius of curvature, wherein the central part has a radius $R_{CP}$, measured at the internal surface of the preform at the radially outer end of the first tapering portion and along a direction which is orthogonal to the longitudinal axis of the preform, of from 6 to 8 mm and the first tapering portion increases in thickness $\delta T$ by from 0.075 to 0.25 mm from the radially outer end of the first tapering portion to the radially inner end of the first tapering portion, wherein the ratio of $R_{CP}/\delta T$ is from 30 to 70, and the transition portion comprises a second, upwardly and radially outwardly tapering portion extending away from the central part to connect to the hollow body portion, the second tapering portion increasing in thickness from the central part to the hollow body portion.

2. An injection moulded thermoplastic preform according to claim 1 wherein the first tapering portion increases in thickness by from 0.075 to 0.125 mm from the radially outer end of the first tapering portion to the radially inner end of the first tapering portion.

3. An injection moulded thermoplastic preform according to claim 1 wherein the radially outer end of the first tapering portion has a thickness from 1.7 to 2.1 mm and the radially inner end of the first tapering portion has a thickness from 1.8 to 2.2 mm.

4. An injection moulded thermoplastic preform according to claim 1, wherein the ratio of $R_{CP}/\delta T$ is from 40 to 60.

5. An injection moulded thermoplastic preform according to claim 1 wherein the central part extends over from 75 to 90% of the internal radius of the lower end of the hollow body portion.

6. An injection moulded thermoplastic preform according to claim 1 wherein the central part is dome shaped and has a shallow concave internal curvature with a minimum radius of internal curvature of from 100 to 200 mm.

7. An injection moulded thermoplastic preform according to claim 6 wherein the central part has a substantially constant radius of internal curvature.

8. An injection moulded thermoplastic preform according to claim 1 wherein the second tapering portion is formed between an outer frustoconical wall inclined at an angle of from 18 to 24 degrees to the longitudinal axis of the preform and an inner frustoconical wall inclined at an angle of from 12 to less than 18 degrees to the longitudinal axis of the preform.

9. An injection moulded thermoplastic preform according to claim 1 wherein the second tapering portion has a length of from 5 to 15 mm.

10. An injection moulded thermoplastic preform according to claim 1 wherein the second tapering portion increases in thickness by at least 25% from a lower end adjacent to the central part to an upper end adjacent to the hollow body portion.

11. An injection moulded thermoplastic preform according to claim 10, wherein the second tapering portion increases in thickness by from 25% to 75%, from the lower end adjacent to the central part to the upper end adjacent to the hollow body portion.

* * * * *